US012798357B2

(12) United States Patent
Jansen et al.

(10) Patent No.: US 12,798,357 B2
(45) Date of Patent: Nov. 17, 2026

(54) WHEEL SYSTEM FOR A VEHICLE, VEHICLE AND WHEEL RIM

(71) Applicant: LIGHTYEAR IPCO B.V., Helmond (NL)

(72) Inventors: Wouter Lukas Jansen, Eindhoven (NL); Tim Jansen, Eindhoven (NL)

(73) Assignee: Lightyear IPCo B.V., Helmond (NL)

( * ) Notice: Subject to any disclaimer, the term of this patent is extended or adjusted under 35 U.S.C. 154(b) by 641 days.

(21) Appl. No.: 18/035,014

(22) PCT Filed: Nov. 3, 2021

(86) PCT No.: PCT/EP2021/080511
§ 371 (c)(1),
(2) Date: May 2, 2023

(87) PCT Pub. No.: WO2022/096504
PCT Pub. Date: May 12, 2022

(65) Prior Publication Data

US 2023/0398856 A1 Dec. 14, 2023

(30) Foreign Application Priority Data

Nov. 3, 2020 (NL) ..................................... 2026816

(51) Int. Cl.
*B60K 7/00* (2006.01)

(52) U.S. Cl.
CPC .... *B60K 7/0007* (2013.01); *B60K 2007/0038* (2013.01)

(58) Field of Classification Search
CPC ...................... B60K 7/0007; B60K 2007/0038
See application file for complete search history.

(56) References Cited

U.S. PATENT DOCUMENTS 5,691,584 A * 11/1997 Toida ..................... H02K 7/116 310/67 R
7,528,518 B2 * 5/2009 Maeda
(Continued)

FOREIGN PATENT DOCUMENTS

CN 201390139 Y 1/2010
CN 102044932 A 5/2011
(Continued)

OTHER PUBLICATIONS

Netherlands Search Report dated Mar. 8, 2021, for Netherlands Patent Application No. 2026816.
(Continued)

*Primary Examiner* — James A Shriver, II
*Assistant Examiner* — Nicholas R. Kandas
(74) *Attorney, Agent, or Firm* — Patterson + Sheridan, LLP

(57) ABSTRACT

There is provided a wheel system for a vehicle, the wheel system comprises a stator, a rotor, a rotational bearing and an inwheel motor. The inwheel motor comprises a motor stator and a motor rotor. The rotor is coupled to the stator via the rotational bearing to rotate about a rotational axis. The motor stator is connected to the stator. The motor rotor is connected to the rotor to cooperate with the motor stator to generate an electromagnetic force to rotate the rotor relative to the stator about the rotational axis. The motor stator has a center defining a central plane extending through the center and perpendicular to the rotational axis. The central plane has an inboard side and an outboard side. In operational use, the inboard side faces toward a center of the vehicle, and the outboard side faces away from the center of the vehicle. The rotor has a mounting surface configured to be connected to a wheel rim. The mounting surface is
(Continued)

Figure 1A:
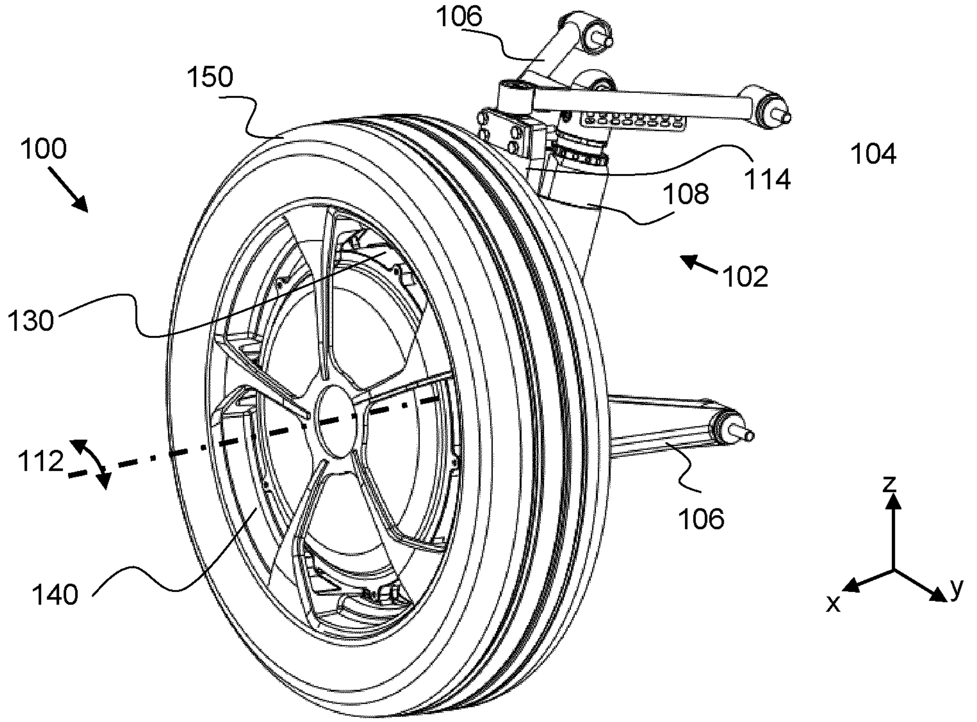

arranged on the inboard side. The rotor couples the mounting surface to the stator only via the inboard side.

15 Claims, 4 Drawing Sheets

(56) References Cited

U.S. PATENT DOCUMENTS

| | | | | |
|---|---|---|---|---|
| 9,254,741 | B2 * | 2/2016 | Park | |
| 10,516,315 | B2 * | 12/2019 | Furuuchi | |
| 10,562,343 | B2 * | 2/2020 | Matsuoka | B60B 7/0033 |
| 10,752,104 | B2 * | 8/2020 | Kawamura | H02K 7/085 |
| 2010/0300782 | A1 * | 12/2010 | Walter | |
| 2015/0108823 | A1 | 4/2015 | Figuered et al. | |
| 2019/0023118 | A1 * | 1/2019 | Van Der Wal | |

FOREIGN PATENT DOCUMENTS

| | | | | | |
|---|---|---|---|---|---|
| CN | 103112313 | A | | 5/2013 | |
| CN | 105966228 | A | * | 9/2016 | B60K 7/0007 |
| CN | 208439059 | U | | 1/2019 | |
| CN | 110217095 | A | | 9/2019 | |
| CN | 209395573 | U | | 9/2019 | |
| DE | 102018218925 | A1 | | 5/2020 | |
| JP | H05116545 | A | | 5/1993 | |
| JP | 2004343905 | A | * | 12/2004 | |
| JP | 2005104222 | A | * | 4/2005 | |
| WO | 0042696 | A1 | | 7/2000 | |

OTHER PUBLICATIONS

PCT Inernational Search Report and Written Opinion dated Mar. 28, 2022, for International Application No. PCT/EP2021/080511.

EPO Office Action dated Sep. 24, 2025, for European Patent Application No. 21823771.7.

Japanese Office Action dated Sep. 30, 2025, for Japanese Patent Application No. 2023-527093.

Chinese Office Action for Application No. 202180085248.0 dated Mar. 18, 2026.

Korean Office Action for Application No. 10-2023-7018827 dated Apr. 21, 2026.

* cited by examiner

WHEEL SYSTEM FOR A VEHICLE, VEHICLE AND WHEEL RIM

The invention relates to a wheel system for a vehicle, a vehicle comprising the wheel system, and a wheel rim for use in the wheel system.

The project leading to this application has received funding from the European Union's Horizon 2020 research and innovation program under grant agreement No. 848620.

Even though wheel systems for vehicles have been known for centuries, there is an ongoing development to improve existing wheel systems.

A wheel system is typically connected to a suspension system that has a spring and a damper. One side of the suspension system is connected to the chassis of the vehicle. The other side of the suspension system supports the wheel system. The suspension system at least partly isolates the chassis from vibrations and forces caused by driving over uneven surfaces such as bumps and holes.

An important property of a wheel system is the so-called unsprung mass. The unsprung mass is the combined mass of the components that are supported by the suspension system, e.g., the combined mass of the rotor, the rim and the tire. Part of the suspension system adds to the unsprung mass in some cases. The suspension system is not able to isolate the unsprung mass from vibrations and forces caused by driving over an uneven surface, because the unsprung mass is located between the uneven surface, e.g., the road, and the suspension system. Only the tire provides some isolation for the unsprung mass when driving over bumps.

When driving over a bump, the unsprung mass is accelerated upward forcefully, whereas the chassis is accelerated upwards much more gentle because of the suspension system. Because the unsprung mass is accelerated upward forcefully, a large contact force may be generated between the road and the rim. The contact force is especially large when driving over a steep bump at a high speed. A large contact force may cause damage to the tire, such as leakage, and/or to the rim, such as plastic deformation or cracking. The lower the unsprung mass, the lower the contact force is for a certain bump at a certain speed of the vehicle. For example, lightweight alloy rims have been developed that have less mass than steel rims with the same size to reduce the unsprung mass. Also, a lower unsprung mass typically improves the vehicle driving behavior and comfort.

Another development that is ongoing, is the development of inwheel motors. An inwheel motor is an electric motor that is arranged inside a wheel. Inwheel motors have the advantage that no transmission system is needed, which reduces the weight of the vehicle considerably. Also, each wheel with an inwheel motor can be controlled individually, which improves the performance of the vehicle.

An inwheel motor is know from German patent application DE19548117A1. The known inwheel motor has a stator and rotor. The rotor rotates relative to the stator along a motor axis. A rim is connected to the rotor via a connection bolt. Magnets, coils and a stack of sheet metal is provided to generate an electromagnetic force to rotate the rotor.

A disadvantage of the known inwheel motor is that the unsprung mass is large, because the inwheel motor is arranged in the wheel. The magnets and the stack of sheet metal are heavy components. Driving a vehicle with the known inwheel motor over an uneven surface, such as over a curb or through a pothole, could lead to damage to the tire, the rim or the rotor.

It is an object of the invention to reduce the unsprung mass of a wheel system.

The object of the invention is achieved by a wheel system for a vehicle, wherein the wheel system comprises a stator, a rotor, a rotational bearing and an inwheel motor comprising a motor stator and a motor rotor. The rotor is coupled to the stator via the rotational bearing to rotate about a rotational axis. The motor stator is connected to the stator. The motor rotor is connected to the rotor to cooperate with the motor stator to generate an electromagnetic force to rotate the rotor relative to the stator about the rotational axis. The motor stator has a center defining a central plane extending through the center and perpendicular to the rotational axis. The central plane has an inboard side and an outboard side. In operational use, the inboard side faces toward a center of the vehicle, and the outboard side faces away from the center of the vehicle. The rotor has a mounting surface configured to be connected to a wheel rim. The mounting surface is arranged on the inboard side. The rotor couples the mounting surface to the stator only via the inboard side.

A vehicle has a wheel system to carry the weight of the vehicle and to steer the vehicle in a desired direction. Therefore, forces are applied between the road and the chassis of the vehicle via the wheel system. The chassis, or at least most of the chassis, is located on the inboard side. So by arranging the mounting surface on the inboard side, and by connecting the mounting surface to the stator only via the inboard side, forces between the road and the chassis are transferred along a path that is as short as possible. Because these forces are transferred along a path that is as short as possible, less material is needed for the rim and the rotor to transfer these forces at acceptable deformations and stresses.

In comparison, in the known inwheel motor of DE19548117A1, the rim is connected via the connection bolt on the most outboard axial surface of the rotor. A rotational bearing near the most outboard axial surface supports the rotor on the stator. The stator extends all the way through the inwheel motor towards the suspension system. The weight of the vehicle creates a radial force on the rim. The radial force needs first to be transferred in the outboard direction from the to the axial surface of the rim. The radial force is then transferred from the rim to the most outboard axial surface of the rotor. The force is then transferred from the rotor to the most outboard part of the stator, before the radial force is transferred towards the inboard direction. As a result, the rim and the stator of the known inwheel motor require much more material to achieve acceptable deformations and stresses than the inwheel motor according to the invention.

By arranging the mounting surface on the inboard side and by coupling the rotor to the mounting surface to the stator only via the inboard side, the stator can be made shorter. The stator does not have to extend on the outboard side of the inwheel motor to support the rotor via a rotational bearing. Instead, the stator only needs to extend far enough to the outboard side to support the motor stator. In an example, the stator extends to the outboard side of the inwheel motor, but because the stator does support the rotor on the outboard side of the inwheel motor, the stator can have a lighter construction than the stator of the known inwheel motor. Because the stator does not extend beyond the inwheel motor on the outboard side to support the rotor, the rotor does not support the rim on the outboard side. The rotor has no structural part that transfers forces from the rim to the stator via the outboard side. As a result, material can be removed from the rotor on the outboard side, making the rotor lighter than the rotor of the known inwheel motor. Some of the material that is removed from the outboard side, can be added to strengthen the rotor on the inboard side. In example, all material that is removed from the outboard side, is added to strengthen the rotor on the inboard side. Instead of achieving a reduced mass of the rotor, the result is a rotor that is more resistant to damage or deformation.

Because the mounting surface is on the inboard side, the rim does not need an axial surface on the outboard side of the rim that has a strong enough construction to carry the weight of the vehicle. Instead, the rim is mounted on the rotor more towards the inboard side, so the rim does not need the material on an axial surface on the outboard side.

In the inwheel motor according to the invention, the stator is for example provided with connection means to connect to the suspension system of the vehicle. For example, the stator has a mounting surface to bolt the stator onto a body of the suspension system. The stator has, for example, a tubular shape. The suspension system has a circular opening to receive the tubular shape of the stator. In another example, the suspension system has a shaft. The tubular shape of the stator is mounted over the shaft of the suspension system. The stator is, for example, integrated with the suspension system. For example, the stator is be connectable to the shock absorber.

The rotor is coupled to the stator via the rotational bearing to rotate about a rotational axis. The rotational axis is the axis about which the wheel rotates so the vehicle can move. In this patent application, terms such as 'radial', 'axial' and 'tangential' refer to the rotational axis, unless indicated otherwise. The expressions 'radial direction' and 'axial' direction' are directions relative to the rotational axis, i.e., respectively radial to the rotational axis and axial to the rotational axis. The axial direction is along the longitudinal direction of the axis.

The expressions 'inboard side' and 'outboard side' are used to indicate a side of a component or a plane that is respectively closest to the center of the vehicle or furthest from the center of the vehicle.

The rotor extends radially outward from the rotational axis. In an example, the rotor radially encloses the stator. The inwheel motor is arranged in the enclosure created by the rotor. In an example, the rotor substantially has a disc-shape. The disc-shape extends in a radial direction. The disc-shape extends, for example, from the rotational bearing to the mounting surface via the inboard side of the stator. For example, the mounting surface is configured on an axial surface of the disc-shape. The axial surface faces at least partly in the axial direction of the axis. The motor rotor is coupled to the rotor on an axial surface of the disc-shape. The mounting surface and the motor rotor are coupled to the same axial surface of the disc-shape or to different axial surfaces of the disc-shape. The rotor is axisymmetric or rotational symmetric. In the example that the rotor is rotational symmetric, the rotor is, for example, provided with ribs extending between the rotational bearing and the mounting surface. The rotor may have 3 or 4 or 5 or 6 or any suitable amount of ribs. The ribs may provide radial and axial stiffness to the rotor. The rotor has, for example, material that extends tangentially between the ribs and that has less thickness in the axial direction of the rotor than the ribs. That material may provide tangential stiffness to the rotor to transfer a drive torque between the motor rotor and the wheel rim. Despite that the material has less thickness in the axial direction of the rotor than the ribs, the material is well-suited to transfer the drive torque, because the material extends tangentially between the ribs. In an example, the rotor has a cylindrical shape. The cylindrical shape has one side that is substantially closed by an axial surface of the rotor. The axial surface of the rotor is coupled to the rotational bearing on the stator. The axial surface is arranged at least partly on the inboard side of the stator. The axial surface extends between the rotational bearing and the mounting surface via the inboard side of the stator. The axial surface is, for example, provided with ribs to reinforce the axial surface. The ribs extend, for example, radially. Inside the cylindrical shape, the inwheel motor is arranged. For example, the motor rotor is arranged on the inner surface of the cylindrical shape.

The rotational bearing is a bearing that supports the rotor on the stator. The rotational bearing is, for example, a roller bearing, such as a tapered roller bearing and a needle roller bearing, or a ball bearing, such as a double row ball bearing. The rotational bearing is configured to allow rotation of the rotor relative to the stator about the rotational axis, and to constrain the rotor relative to the stator in all other directions. For example, the rotational bearing is configured to constrain the rotor relative to the stator in the radial direction, in the axial direction, and in rotational directions perpendicular to the rotational axis. The rotational bearing is a single bearing or comprises multiple bearings, such as two bearings. The multiple bearings are for example arranged at a distance from each other along the rotational axis to better constrain the rotor relative to the stator in the rotational directions perpendicular to the rotational axis. In case of multiple bearings, the rotor is configured to connect the mounting surface to the multiple bearings only via the inboard side. The rotor does not connect the mounting surface to any one of the multiple bearings via the outboard side of the stator.

The inwheel motor is an electric motor that generates an electromagnetic force. The inwheel motor has a motor stator and a motor rotor. The electromagnetic force is generated by an interaction of the magnetic fields of the motor stator and the motor rotor. The magnetic field of one of the motor stator and the motor rotor is generated by electrical coils. By applying an electric current through the electrical coils, the electrical coils generate a magnetic field. The magnetic field of the other of the motor stator and motor rotor is generated by permanent magnets, by ferromagnetic material, by further electrical coils or a combination thereof. The magnetic field of the ferromagnetic material and the further electrical coils may be induced by the electrical field generated by the electric current through the electrical coils.

In view of providing electrical wires, it is easier to provide the electric current to electrical coils on the motor stator, because the motor stator does not rotate relative to the chassis, like the motor rotor does. In that example, the motor rotor is provided with permanent magnets, with ferromagnetic material and/or electrical coils that do not have a wire connection to the chassis. In the chassis, an electric power source, such as a battery, provides the electric current to the electrical coils. In case the motor rotor comprises electrical coils that are provided with the electric current, a slip ring is, for example, provided to bring the electric current from the electric power source to the motor rotor. Electrical coils on the motor rotor are, in another example, provided with electric current via induction.

The motor stator has a center defining a central plane. The central plane extends through the center and is perpendicular to the rotational axis. The central plane extends through the middle of the motor stator. For example, the motor stator extends parallel to the rotational axis from a first edge of the motor stator to a second edge of the motor stator. The center is a point along the rotational axis halfway between the first edge and the second edge. In an example, the motor stator comprises a plurality of electrical coils, the center plane extends through the centers of the electrical coils. In another example, the motor stator comprises a multiple arrays of electrical coils. The electrical coils in an array are arranged tangentially along the motor stator. The arrays are arranged adjacent to each other in a direction parallel to the rotational axis. In that example, the central plane goes through the center defined by the most inboard edge of the most inboard array, and the most outboard edge of the most outboard array.

The central plane has an inboard side that faces toward a center of the vehicle. Most or all of the chassis of the vehicle is arranged on the inboard side of the central plane. For example, the cabin of the vehicle is on the inboard side of the central plane. The central plane has an outboard side that faces away from the center of the vehicle. The outboard side is opposite to the inboard side of the central plane. When looking from the central plane in the direction of the outboard side, no or almost no part of the chassis is visible. In case a closed wheel arch is applied, the closed wheel arch is a part of the chassis that could be present on the outboard side of the central plane. In some embodiments, the inboard side of the central plane faces the location where the suspension system is connected to the chassis. In some embodiments, the inboard side of the central plane faces the suspension.

The rotor is provided with the mounting surface to which the wheel rim can be mounted. The mounting surface is a surface that contacts a surface of the wheel rim to place the wheel rim on the rotor. The mounting surface is for example provided with threaded holes. Wheel bolts are able to clamp the wheel rim onto the mounting surface. In another example, the mounting surface is provided with threaded rods. When the wheel rim is mounted onto the mounting surface, the threaded rods extend through holes in the wheel rim. Wheel nuts are placed on the threaded rods to clamp the wheel rim on the mounting surface. The mounting surface is, for example, provided with alignment features to concentrically align the wheel rim with the rotor. The alignments features comprise, for example, one or more protrusions on the mounting surface, and/or one or more recesses on the mounting surface. The alignment features on the mounting surface cooperate with alignment features on the wheel rim, such as protrusions or recesses. The alignment features of the mounting surface are, for example, formed by the shape of the threaded holes or the threaded rods. The threaded holes or threaded rods may have conical surfaces that cooperate with conical surfaces of the wheel bolts or wheel nuts. In this example, the wheel bolts or wheel nuts not only clamp the wheel rim onto the mounting surface, but also concentrically align the wheel rim relative to the rotor. In another example, the mounting surface is a conical surface that cooperates with a conical surface of the wheel rim to concentrically align the wheel rim on the rotor. The mounting surface comprises a single surface to contact the wheel rim or comprises multiple, separated surfaces to contact the wheel rim. For example, the mounting surface comprises three separated surfaces that are radially arranged about the rotational axis at angles of 120° relative to each other.

The mounting surface is arranged on the inboard side of the central plane. This means that the mounting surface is more on the inboard side than the central plane of the motor stator. The mounting surface is closer the center of the vehicle than the central plane of the motor stator.

The rotor couples the mounting surface to the stator only via the inboard side. So the rotor extends from the rotational bearing to the mounting surface via the inboard side of the stator. No part of the rotor extends from the rotational bearing to the mounting surface via the outboard side of the stator.

In an embodiment, the mounting surface is radially outward of the motor rotor.

According to this embodiment, the electromagnetic force that drives the vehicle is created by the cooperation of the motor rotor and the motor stator. The electromagnetic force acts on the motor rotor and the same electromagnetic force in opposite direction acts on the motor stator. The electromagnetic force needs to be transferred from the motor rotor to the wheel rim, and via the wheel rim to the tire, and via the tire to the road. Because the tire supports the vehicle on the road on a radial surface of the tire, the wheel rim and the tire are arranged radially outward of the motor rotor. This allows the inwheel motor to be arranged radially inward of the tire and wheel rim. By arranging the mounting surface radially outward of the motor rotor, the electromagnetic force is transferred from the motor rotor to the tire along the shortest possible path. The electromagnetic force is directed radially outward from the motor rotor to the mounting surface. The electromagnetic force is transferred from the mounting surface to the wheel rim, and via the wheel rim to the tire. Because the electromagnetic force is transferred radially outward from the motor rotor to the mounting surface, the electromagnetic force does not need to be transferred to any part of the rotor that is radially inward of the motor rotor. The part of the rotor that is between the mounting surface and the motor rotor may be constructed using more material to transfer the electromagnetic force with reduced stress and deformation of the rotor, without the need to use more material radially inward of the motor rotor.

In an embodiment, the motor stator comprises a plurality of coils. The coils are configured to cooperate with the motor rotor under control of an electrical current through the coils to generate the electromagnetic force. The central plane extends through a center of the coils.

In this embodiment, a plurality of electric coils are provided. The electric coils are further referred to as 'coils'. The central plane extends through the center of the coils. For example, the plurality of coils are arranged tangentially along the motor stator. The centers of the coils are all arranged on the same axial position on the rotational axis. The rotor couples the mounting surface to the stator only via the inboard side of the central plane, which is on the inboard side of the plurality of coils. The rotor does not connect the mounting surface to the stator via the outboard side of the plurality of coils. In an example, the rotor is configured such that the outboard side of the motor stator does not face any part of the rotor along a direction parallel to the rotational axis.

By providing an electric current through the plurality of coils, an electromagnetic force is created between the coils on the motor stator and the motor rotor. This electromagnetic force is sometimes referred to as Lorentz force. The motor rotor is provided with coils or permanent magnets or ferromagnetic material to cooperate with the coils on the motor stator to generate the Lorentz force. To accelerate the vehicle, a large electric current is applied to the coils to generate a large electromagnetic force. To maintain the vehicle at a constant speed, a small electric current is applied to the coils to generate an electromagnetic force that is sufficient to compensate for wind and/or roll resistance and/or height differences of the road. To decelerate the vehicle, the electric current can be reversed to generate an electromagnetic force in the opposite direction. Optionally, the inwheel motor is used as a generator during deceleration of the vehicle, in which the inwheel motor generates an electric current that is stored in a battery of the vehicle.

In an embodiment, the motor rotor comprises a plurality of magnets to cooperate with the plurality of coils to generate the electromagnetic force.

According to this embodiment, the interaction between the magnets of the motor rotor and the coils of the motor stator generate the electromagnetic force. The interaction occurs as a magnetic flux is created in a gap between the magnets and the coils. The gap, that is preferably as small as possible without completely closing, is typically referred to as the flux bearing gap. The stronger the magnetic flux in the flux bearing gap, the stronger the electromagnetic force. The magnetic flux depends on the strength of the magnetic field created by the permanent magnets and by the amount of the electric current through the coils. The flux bearing gap should be large enough that during operational use of the wheel system, the flux bearing gap is not closed, for example when hitting a curb stone. Safety measures may be taken to avoid the flux bearing gap from closing accidentally. The reluctance of the inwheel motor is optionally reduced by arranging ferromagnetic material near the permanent magnets, such as a back-iron or iron teeth. The back-iron is a component comprising iron or any other ferromagnetic material. Multiple magnets are for example arranged on the back-iron on a surface opposite to the surface of the magnet facing the coils. Because of the good magnetic permeability of the ferromagnetic material compared to, for example, air, the magnetic flux over the flux bearing gap can be increased by using iron or any other suitable ferromagnetic material.

In an embodiment, the inwheel motor is one of an axial flux motor and a radial flux motor.

In an axial flux motor, the flux bearing gap is arranged axially. In the example of coils on the motor stator and permanent magnets, this means the following. The coils and the magnets are arranged at an offset relative to each other along the axial direction. The coils and the magnets are arranged to face each other in the axial direction. The magnetic flux propagates over the flux bearing gap in the axial direction as a result. In an example, there are two flux bearing gaps, one on each side of the motor stator along the axial direction. In this example, there are two arrays of magnets. Each array of magnets faces one side of the motor stator. The coils of the motor stator are arranged axially in between the two arrays of magnets. The rotor is for example arranged to support the magnets of the motor rotor at the outboard side of the motor stator. So part of the rotor may be present on the outboard side of the motor stator. However, the part of the rotor that is present on the outboard side of the motor stator does not connect the mounting surface to the stator.

In a radial flux motor, the flux bearing gap is arranged radially. In the example of coils on the motor stator and permanent magnets on the motor rotor, this means the following. The coils and the magnets are arranged at an offset relative to each other along the radial direction. The magnets of the motor rotor are arranged radially outward of the coils of the motor stator. The coils and the magnets are arranged to face each other in the radial direction. The magnetic flux propagates over the flux bearing gap in the radial direction as a result.

In an embodiment, the wheel system comprises a cover plate connected to the rotor. The cover plate is arranged on the outboard side of the central plane. The cover plate is configured to axially cover the inwheel motor.

According to this embodiment, the cover plate covers the inwheel motor on the outboard side of the stator. The inboard side of the inwheel motor is at least partly covered by the rotor, since the rotor connects the mounting surface to the stator on the inboard side of the motor stator. However, the rotor may cover nothing of or only a part of the inwheel motor in the axial direction on the outboard side. In view of assembling the inwheel motor, it is beneficial that the rotor does not cover the inwheel motor in the axial direction on the outboard side. This allows the inwheel motor to be assembled in the rotor by moving the parts of the inwheel motor along the axial direction towards the inboard side into the rotor. However, during operational use of the wheel system, the inwheel motor needs to be protected against ingress of liquid (e.g. rain), debris and impact. Also, because the inwheel motor is a high-voltage component, a safety measure is needed to prevent someone from accidentally touching the electronic components of inwheel motor, for example when exchanging a tire. The cover plate is provided to protect the inwheel motor against water and dirt, and to provide the safety measure to prevent some accidentally touching the inwheel motor. The cover plate is, for example, a disk-shape or a cone shaped plate. The cover plate has, for example, a cylindrical shape. The end surface of the cylindrical shape axially covers the inwheel motor. The lateral surface of the cylindrical shape radially covers the inwheel motor. Because the rotor connects the mounting surface with the rotational bearing only on the inboard side of the motor stator, there is no direct connection between the cover plate and the stator. Instead, the cover plate is connected to the stator via the rotor and the rotational bearing via the inboard side of the motor stator.

The cover plate is provided with mounting means, for example on the edge of the cover plate, to mount the cover plate on the rotor. The mounting means comprise, for example, fasteners such as bolts and nuts, that allow the cover plate to be removed from the rotor. This allows access to the inwheel motor in case the inwheel motor requires repairs. The fasteners include, for example, at least one locking nut or locking bolt that requires a dedicated tool to remove the locking nut or locking bolt from the rotor. This may ensure that only qualified personal has access to the inwheel motor. In case it is expected that the inwheel motor will not require repairs or hardly ever, the cover plate may be glued to the rotor. To remove the cover plate from the rotor in case of repairs, the glue will need to be cut, torn or dissolved.

The cover plate is, for example, provided with reinforcement structures. The reinforcement structures provide additional material in the cover plate to provide additional strength. The reinforcement structures help to prevent or limit deformation of the cover plate in case the cover plate is hit by an object, for example during an accident or when hitting an object that lies on the road etc. For example, the reinforcement structure is a rib structure, wherein multiple ribs are radially arranged. The ribs extend, for example, from the center of the cover plate to the edge of the cover plate, near the mounting means at which the cover plate is connected to the rotor. The ribs structure is for example arranged rotational symmetrically about the rotational axis. In another example, the reinforcement structure provides more thickness of the cover plate in the center of the cover plate, and less thickness of the cover plate near the edge of the cover plate. In this example, the reinforcement structure provides additional stiffness to limit deformation of the center of the cover plate in the axial direction. The reinforcement structure has, in an example, a combination of ribs and ring-shaped structures to provide additional stiffness to the cover plate. The stiffness of the cover plate increases, in an example, a stiffness of the rotor. For example, the stiffness of the cover plate helps to limit radial deformation of the rotor even when the vehicle is under a heavy load. In another example, the stiffness of the cover plate helps to reduce the Noise Vibration Harshness (NVH) behavior of the vehicle. The reinforcement structure is, for example, an integrated part of the cover plate, that is formed by casting or molding the cover plate with the reinforcement structure as a single part. In another example, the reinforcement structure is coupled to the cover plate, for example by welding or bolting or gluing.

In an embodiment, the rotor radially encloses the stator.

According to this embodiment, the rotor surrounds the stator. This way, a space is defined between the rotor and the stator to accommodate the inwheel motor. The result is a wheel system that makes efficient use of space to accommodate the rotor, the stator and the inwheel motor. Preferably, the rotor has the largest diameter possible. By providing the rotor with the largest diameter possible, the motor rotor can be placed on the largest diameter possible. The larger the diameter at which the motor rotor is placed, the more torque the inwheel motor can provide. Preferably, the rotational bearing is arranged at the smallest radial position possible. By providing the rotational bearing at the smallest radial position possible, any friction force that is caused by the rotational bearing due to the rotation of the rotor relative to the stator, is at the smallest radial position possible. Because the friction force is at the smallest radial position possible, the friction force causes only a small loss of the drive torque provided by the wheel system.

In an embodiment, the wheel system comprises a brake system having a brake disk and a caliper. The brake disk is connected to the rotor. The brake disk and the caliper are configured to contact each other at a force location to generate a brake force. The mounting surface is radially outward of the force location.

According to this embodiment, the brake disk and the caliper cooperate to generate a brake force to decelerate the vehicle. The caliper is actuated, for example hydraulically, pneumatically, electronically or mechanically, to contact the brake disk. When the caliper contacts the brake disk, for example contacting the brake disk on two opposite sides, the brake force is created between the caliper and the brake disk. Because the caliper and the brake disk move relative to each other while the brake force is being created, energy is dissipated. Because of the dissipating energy, the vehicle loses kinetic energy, causing the vehicle to decelerate. The brake force needs to be transferred from the rotor to the wheel rim, and via the wheel rim to the tire, and via the tire to the road. Because the tire supports the vehicle on the road on a radial surface of the tire, the wheel rim and the tire are arranged radially outward of the brake disk. By arranging the mounting surface radially outward of the brake disk, the brake force is transferred from the brake disk to the tire along a short path. The brake force is directed radially outward from the brake disk to the mounting surface. The brake force is transferred from the mounting surface to the wheel rim, and via the wheel rim to the tire. Because the brake force is transferred radially outward from the brake disk to the mounting surface, the brake force does not need to be transferred to any part of the rotor that is radially inward of the brake disk. The part of the rotor that is between the mounting surface and the motor rotor may be constructed using more material to transfer the brake force with reduced stress and deformation of the rotor, without adding material to the rotor radially inward of the brake disk.

In an embodiment, at least part of the rotational bearing is arranged closer to the central plane than the mounting surface is arranged to the central plane.

According to this embodiment, the rotational bearing and the mounting surface are not on the same axial position. Instead, the rotational bearing is arranged closer to the central plane of the motor stator than the mounting surface is arranged to the central plane. This has the advantage that the mounting surface can be arranged at an axial position that is far into the inboard direction. This reduces the amount of material that is needed for the rotor to transfer a force on the wheel rim to the rotational bearing via the inboard side of the motor stator. For example, if the mounting surface is arranged far enough from the central plane, a part of the rotor starting from the mounting surface radially inward may be straight. This straight shape is especially suited to transfer a radially force with only a low stress and little deformation. The rotational bearing is located more towards the central plane than the mounting surface, which may be beneficial for several reasons. By placing the rotational bearing more towards the central plane of the motor stator, the rotational bearing is, for example, more aligned with the center of the wheel rim. The more the rotational bearing is aligned with the center of the wheel rim, the lower the bending moment is in a direction perpendicular to the rotational axis on the rotational bearing caused by the weight of the vehicle. This allows the use of smaller and/or less expensive rotational bearings. Another example is that this frees up space for other components of the wheel system or the vehicle. For example, by placing the rotational bearing more towards the central plane, space can be created to accommodate a mounting plate to mount the stator to the suspension system. This may reduce the axial dimensions of the wheel system.

In an embodiment, the wheel system comprises a wheel rim. The wheel rim comprises two bead seats for holding a tire. The wheel rim defines a central rim plane in a radial direction of the wheel rim. The two bead seats are arranged symmetrically at opposite sides of the central rim plane. The wheel rim comprises a mounting body configured to connect to the mounting surface. The mounting body is arranged at least partly on an inboard side of the central rim plane.

According to this embodiment, the two bead seats provide the surfaces onto which the tire is held by the wheel rim. The two bead seats are the surfaces with which the edges of the side wall of a tire make contact, after the tire is inflated. One side wall makes contact with one bead seat. Each of the two bead seats is, for example, adjacent to a radial extending protrusion, such as the flange of the wheel rim, to prevent the tire from axially moving away from the bead seat. The bead seats are arranged symmetrically relative to the central rim plane, i.e., an axial distance between the central rim plane and one of the bead seats is the same as an axial distance between the central rim plane and the other of the bead seats. Because tires have a symmetrical cross-section, the central rim plane aligns with the center of the tire. The wheel rim does not have to be completely symmetrical relative to the central rim plane. For example, the wheel rim has more material or extends more on one side of the central rim plane than on the other side of the central rim plane. In another example, the complete wheel rim is symmetrical relative to the central rim plane. The mounting body is the part of the wheel rim that is configured to connect to the mounting surface. The mounting body has a surface to contact the mounting surface. The mounting body is, for example, provided with a through hole to accommodate a bolt to clamp the mounting body on the mounting surface. The through hole is, for example, to accommodate a threaded rod extending from the mounting surface, so a nut is able to cooperate with the threaded rod to clamp the mounting body to the mounting surface. The mounting body is arranged at least partly on an inboard side of the central rim plane to reduce the path over which a force is transferred from the tire to the suspension system. This allows the wheel system to be made with less material while maintaining acceptable stresses and deformations caused by forces on the tire.

In an embodiment, the rotational bearing is arranged aligned with the central rim plane.

According to this embodiment, the rotational bearing is aligned with the center of the tire. This has the advantage the radial force on the tire caused by the weight of the vehicle is aligned with the rotational bearing. As a result, no or only a very small bending moment in a direction perpendicular to the rotational axis is created on the rotational bearing by the weight of the vehicle. This allows the use of cheaper and/or smaller rotational bearings. To withstand a large bending moment, the rotational bearing would, for example, have a large dimension along the rotational axis to provide sufficient bending stiffness. The large dimension would reduce the forces on the rotational bearing caused by the large bending moment. However, for a small bending moment or no bending moment, the dimension of the rotational bearing along the rotational axis can be small.

In an embodiment, the wheel system comprises a fastener, such as a wheel nut, to clamp the mounting body between the mounting surface and the fastener. The wheel rim comprises a rim well. The rim well is arranged between the bead seats. At least part of the fastener is arranged on an outboard side of the rim well.

The fastener comprises a wheel nut or a wheel bolt or any other type of fastener that is able to clamp the mounting body onto the mounting surface. The fastener is preferably easily removable to allow the tires to be changed. For example, the user of the vehicle should be able to remove the fastener to change a wheel rim with flat tire or to change a wheel rim with a summer tire for a wheel rim with a winter tire and vice versa. One or more fasteners comprise, for example, a lock nut or a lock bolt that can only be removed by using a dedicated tool. This helps to prevent the wheel rim from being stolen. The wheel rim has a radial outward facing surface. The bead seats are part of the radial outward facing surface. The section of the radial outward facing surface faces the inside of a tire, when the tire is mounted on the wheel rim. That section of the radial outward facing surface also forms the rim well. The rim well is a surface that is more radially inward than the bead seats. The rim well extends, for example, several centimeters such as 5 or 10 or 15 cm along the axial direction. The rim well is, for example, several centimeters such as 2 or 5 or 10 cm more radial inward than the bead seats. The rim well may help to mount and remove a tire on the wheel rim. The rim well may help to provide sufficient stiffness and flexibility to the wheel rim. By arranging part of the fastener on the outboard side of the rim well, there is more space for that part of the fastener. For example, the fastener comprises a wheel bolt, which has a wheel bolt shaft and a wheel bolt head. The wheel bolt head has a larger diameter than the wheel bolt shaft. The wheel bolt shaft extends through the mounting body to the mounting surface. The mounting body extends radially inward of the rim well. The wheel bolt head is configured to clamp against the mounting body at the outboard side of the rim well. Because the rim well is the most radially inward part of the radial outward facing surface, there is more space at the outboard side of the rim well for the wheel bolt head. Also, there is more space for a socket wrench to be placed over the wheel bolt head to tighten or loosen the wheel bolt. The same advantage applies in the example that a threaded rod extends from the mounting surface through the mounting body, and a wheel nut is applied to the threaded rod to clamp the mounting body on the mounting surface. The space on the outboard side of the rim well is used to accommodate the wheel nut, which has a larger diameter than the threaded rod. Also, the space on the outboard side of the rim well is used to accommodate the socket wrench to tighten or loosen the wheel nut. By arranging part of the fastener on the outboard side of the rim well, there is more radial space to arrange the inwheel motor at a larger diameter, which results in a more efficient inwheel motor.

In an embodiment the wheel rim comprises a wheel cap. The wheel cap is arranged on an outboard side of the central rim plane. The wheel cap is configured to axially cover at least part of an inner space radially enclosed by the wheel rim.

According to this embodiment, the wheel cap is provided to cover an inner space radially enclosed by the wheel rim. The wheel cap covers the inner space axially either completely or partly. In case the wheel cap completely covers the inner space axially, the wheel cap has, for example, a closed disc shape extending from the rotational axis to beyond the radial position of the mounting surface. The closed disc shape is, for example, configured to prevent dirt or water outside the inner space to pass the wheel cap into the inner space. The closed disc shape is, for example, configured to improve the aerodynamics of the wheel system. In case the wheel cap partly covers the inner space axially, the wheel cap has, for example, a plurality of ribs with open spaces between the ribs. The ribs are, for example, configured to protect the components in the inner space. The stiffness and the strength of the ribs are configured to block an object from entering the inner space. The object may for example be debris that lies on the road or a tree branch that is accidentally hit while driving the vehicle. In an example, the wheel cap has a closed disc shape that is reinforced with ribs. The wheel cap comprises a single part or multiple parts. For example, the wheel cap has a main part that covers most of the inner space. The main part has holes to reach the fasteners that clamp the wheel rim on the mounting surface. The wheel cap has additional parts to fill the holes in the main part. The additional parts can be easily removed to access the fasteners, for example, to change the wheel rim. This way, only a small part of the wheel cap needs to be removed when removing a wheel rim. The wheel cap is for example, coupled to the wheel rim at the mounting body, such as on the inboard side of the mounting body and/or at the outboard side of the mounting body. For example, the wheel cap is fastened to the mounting body with fasteners that are arranged alternatingly with fasteners that fastened the mounting body to the mounting surface. This example makes use of the structural strength that is already available at the mounting body. This way, the wheel rim does not need any or hardly any additional material to support the wheel cap. In an example, the wheel cap is connected to the wheel rim at the central rim plane. This has an advantage that the wheel cap does not add stiffness to the edges of the wheel rim. If the vehicle drives over a steep bump, such as a curb, a large contact force may be applied to the edge of the wheel rim. Due to the flexibility of the edge of the wheel rim, the large contact force is reduced. By providing the wheel cap to the wheel rim at the central rim plane, it is prevented that the wheel cap increases the stiffness of the edge of the wheel rim. By preventing an increased stiffness of the edge of the wheel rim, a large contact force or large peak stresses may be prevented.

In an embodiment, the wheel cap comprises a center hole for balancing the wheel rim on a balancing machine.

According to this embodiment, the center hole in the wheel cap is configured to place the wheel rim on a balancing machine. The balancing machine grips the wheel rim via the center hole in the wheel cap and spins the wheel rim. The balancing machine determines the center of gravity of the combination of wheel rim, wheel cap and tire. Based on the determined center of gravity, the balancing machine indicates the location to place a balancing weight and the amount of balancing weight. After applying the balancing weights, the center of gravity is in the middle of the center hole in the wheel cap. The center hole in the wheel cap is representative for the center of the wheel rim as defined by the mounting body. The advantage of the center hole in the wheel cap is that it is possible to balance the wheel rim according to the invention with a conventional balancing machine. A conventional balancing machine is configured to balance known wheel rims, which have a small diameter center hole. However, the mounting body of the wheel rim according to the invention is arranged much more radially outward than the small diameter center hole of conventional wheel rims. By providing the center hole in the wheel cap, the wheel rim according to the invention can be balanced on a conventional balancing machine without the need of additional tooling. In an example, the wheel cap comprises an additional part that fills the center hole during use of the vehicle. The additional part can be removed from the center hole when balancing the wheel rim.

In an embodiment, there is provided a vehicle comprising the wheel system as described above.

According to this embodiment, a vehicle such as a car, a truck, a bus or a motor cycle is provided with the wheel system according to the invention. Preferably, the vehicle has a single-sided wheel suspension system. This means that the suspension system holds the stator only on the inboard side of the wheel system, but not on the outboard side. This allows easy access to the wheel rim and tire via the outboard side. For example, the wheel rim can easily be mounted and removed via the outboard side. In comparison, dual-sided wheel suspension system holds the stator on both sides of the wheel rim. Exchanging the wheel rim would require part of the dual-sided wheel suspension to be disassembled.

The vehicle comprises, for example, a battery to provide electric power to the inwheel motor. For example, the vehicle comprises a solar panel to provide electric power to the battery and to the inwheel motor. The electronics of the vehicle are, for example, configured to use the inwheel motor as a generator when the vehicle needs to decelerate. The electronics are configured to use the kinetic energy of the moving mass of the vehicle to generate an electric current. The electric current charges the battery.

In an embodiment, there is provided a wheel rim for use in a wheel system as described above.

According to this embodiment, the wheel rim is configured to be mounted on the mounting surface of the rotor. The mounting body of the wheel rim is arranged at a suitable radial position to cooperate with the mounting surface of the rotor. Optionally, the wheel rim comprises the wheel cap, which, for example, comprises the center hole to balance the wheel rim on a conventional balancing machine.

Figure 1B:
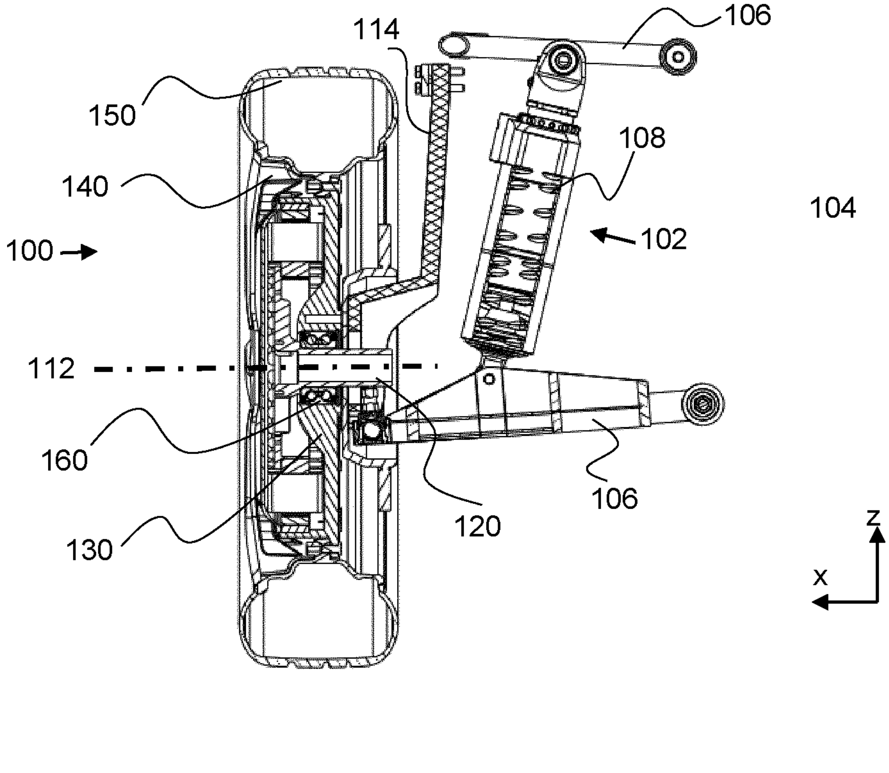
Figure 2:
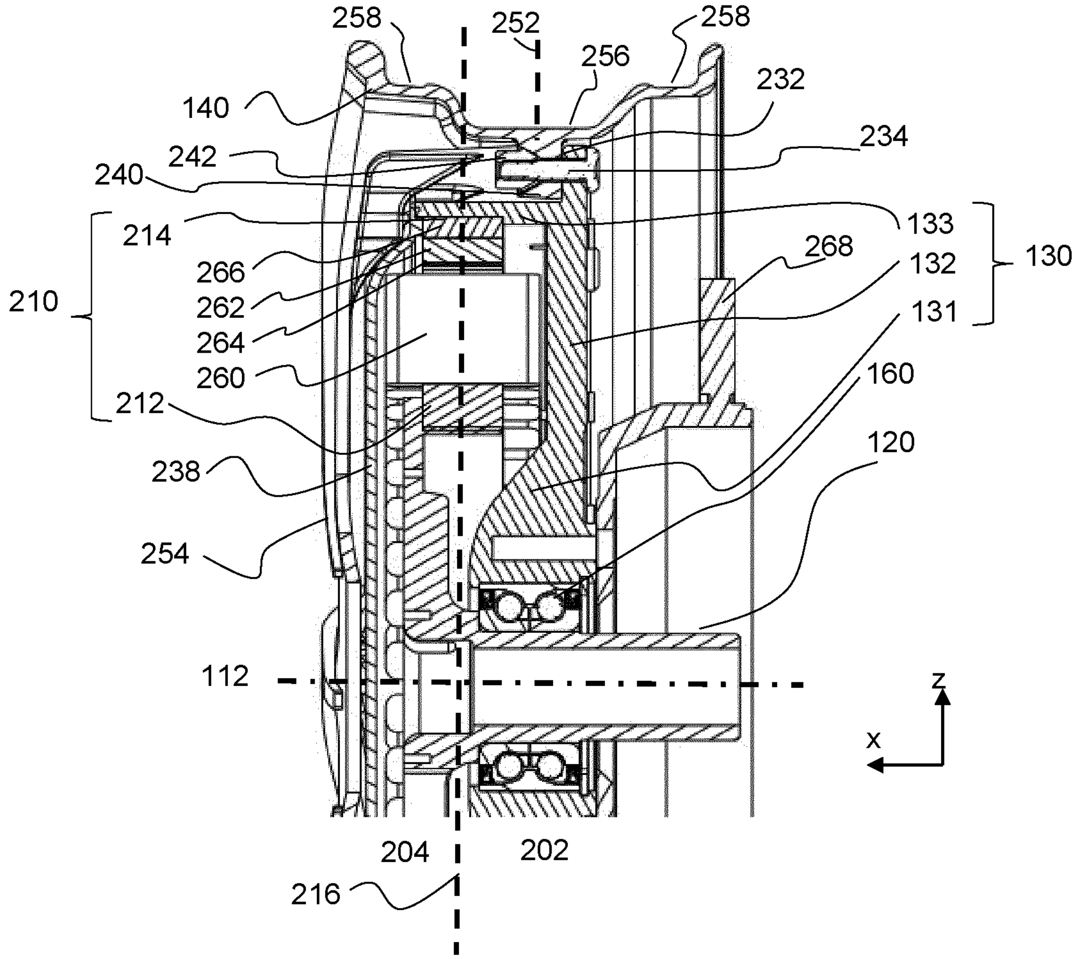
Figure 3:
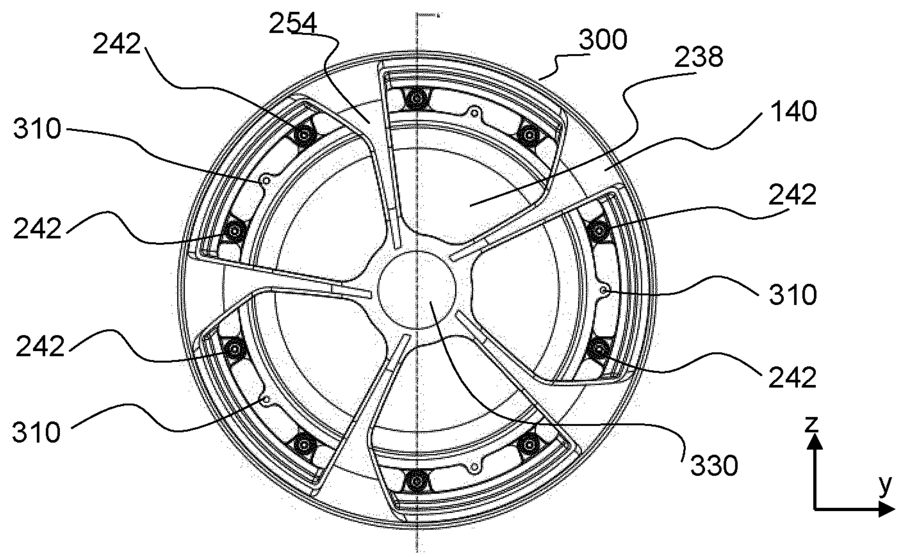

The invention will be described in more detail below under reference to the figures, in which in a non-limiting manner exemplary embodiments of the invention will be shown. The figures are:

FIGS. 1A and 1B: a wheel system according to an embodiment of the invention, FIG. 2: a detailed view of the wheel system according to the embodiment of FIG. 1, FIG. 3: a further detailed view of the wheel system according to the embodiment of FIG.

Figure 4:
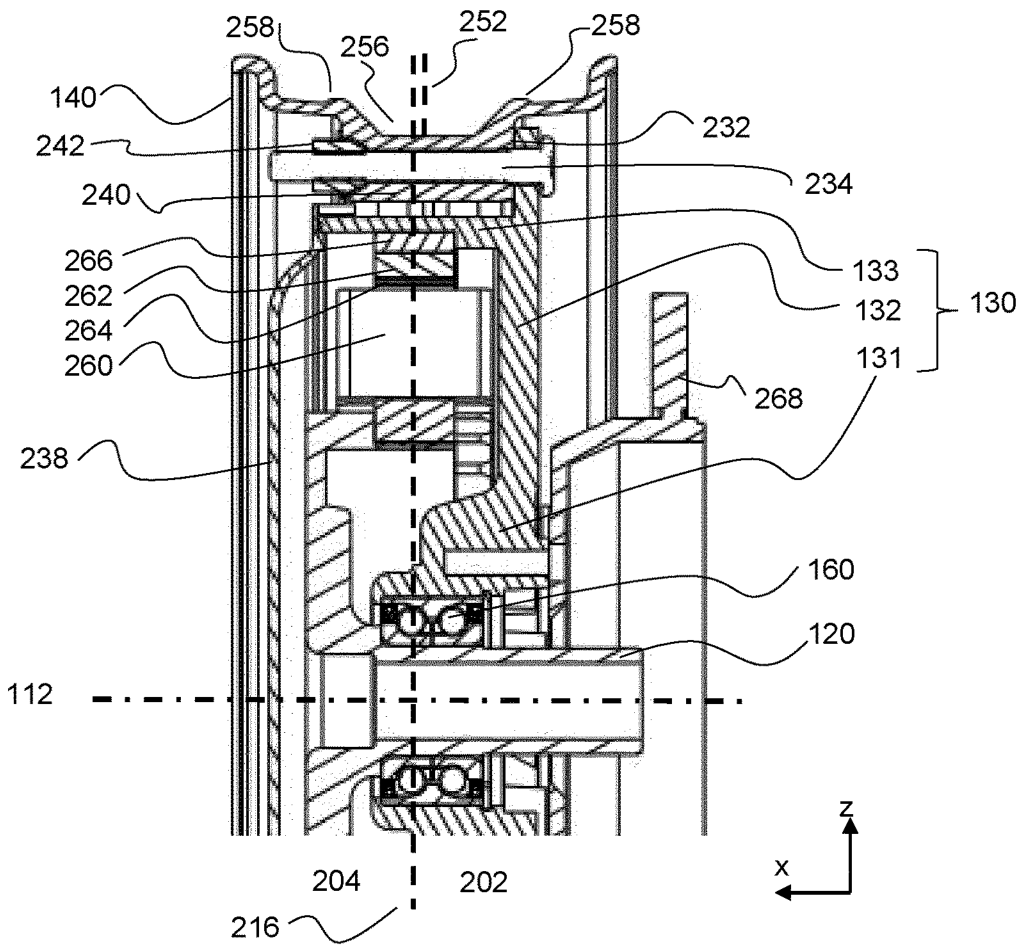
Figure 5:
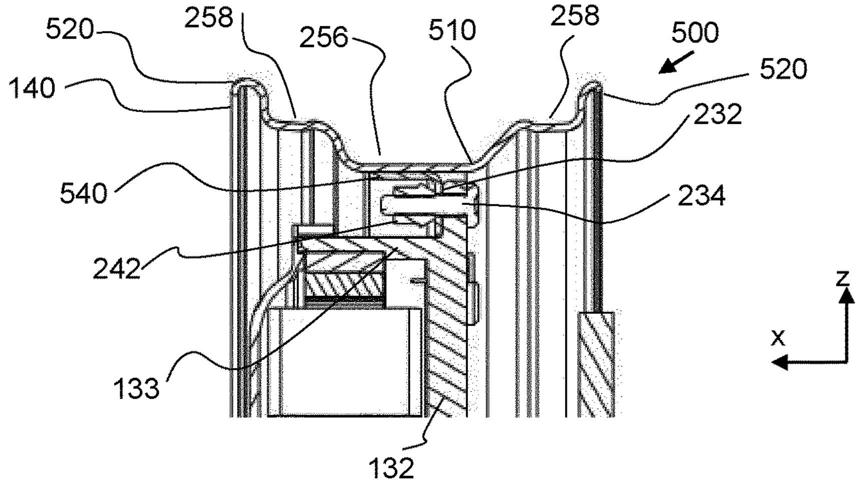
Figure 6:
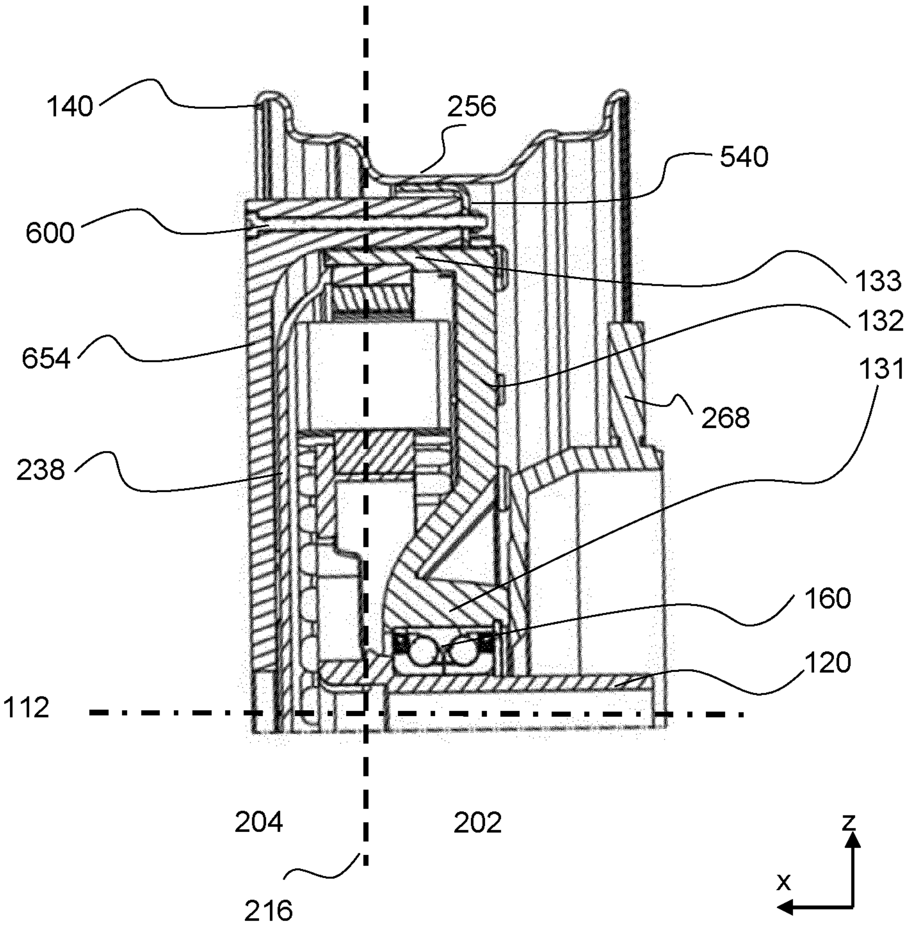
Figure 7:
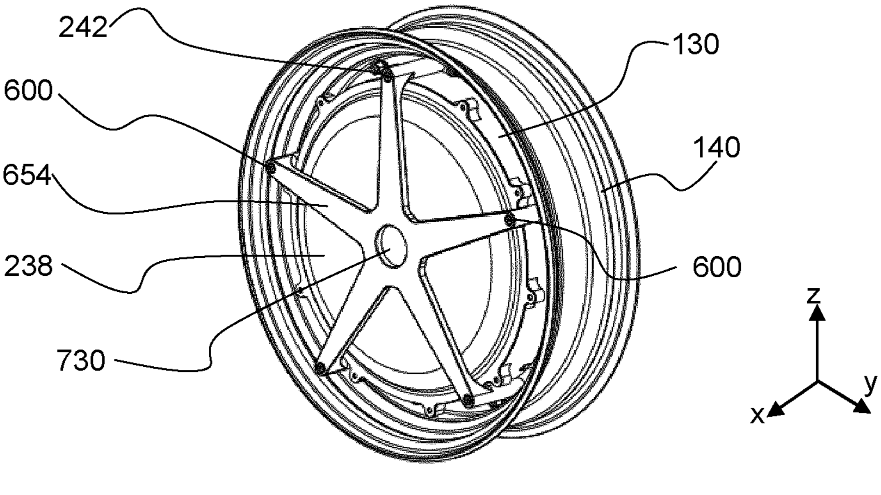

FIG. 4: a cross-section of a wheel system according to a second embodiment of the invention, FIG. 5: a cross-section of a wheel system according to a third embodiment of the invention, FIGS. 6 and 7: a wheel system according to a fourth embodiment of the invention.

FIGS. 1A and 1B show a wheel system 100 according to an embodiment of the invention. The wheel system 100 is coupled to a suspension system 102. The suspension system 102 couples the wheel system 100 to the chassis of the vehicle. The chassis of the vehicle is represented by the reference sign 104.

The suspension system 102 has two arms 106 and a shock absorber 108. The arms 106 are pivotally connected to the chassis to allow movement of the wheel system 100 relative to the chassis. The shock absorber 108, which may include a damper and a coil spring, has one end connected to the upper arm 106. The other end of the shock absorber 108 is connected to the lower arm 106. When driving over an uneven surface, the positions of the arms 106 change relative to each other. As a result, the length of the shock absorber 108 changes, causing the shock absorber 108 to generate a reaction force. By generating the reaction force, the shock absorber 108 limits vibrations from propagating from the wheel system 100 to the chassis, while keeping the wheel system 100 in contact with the road as good as possible.

The wheel system 100 has a stator 120, a rotor 130, a wheel rim 140 and a tire 150. The stator 120 is connected to the suspension system 102 via suspension body 114. The rotor 130 is connected via the rotational bearing 160 to the rotor 130. The rotational bearing 160 allows the rotor 130 to rotate relative to the stator 120 about a rotational axis 112. The rotational axis 112 is perpendicular to a drive direction of the vehicle. The wheel rim 140 is coupled to the rotor 130. The tire 150 is mounted on the wheel rim 140.

FIG. 2 shows a detailed view of the wheel system 100 according to the embodiment of FIG. 1. FIG. 2 shows in a cross-sectional view the wheel system 100 comprising the stator 120, the rotor 130 and the rotational bearing 160. The rotor 130 is connected to the stator 120 via the rotational bearing 160. The wheel system 100 has an inwheel motor 210 comprising a motor stator 212 and a motor rotor 214. The rotor 130 is coupled to the stator 120 via the rotational bearing 160 to rotate about a rotational axis 112. The motor stator 212 is connected to the stator 120. The motor rotor 214 is connected to the rotor 130 to cooperate with the motor stator 212 to generate an electromagnetic force to rotate the rotor 130 relative to the stator 120 about the rotational axis 112. The motor stator 212 has a center defining a central plane 216 extending through the center and perpendicular to the rotational axis 112. The central plane 216 has an inboard side 202 and an outboard side 204. In operational use, the inboard side faces 202 toward a center of the vehicle, and the outboard side 204 faces away from the center of the vehicle. The rotor 130 has a mounting surface 232 configured to be connected to a wheel rim 140. The mounting surface 232 is arranged on the inboard side 202. The rotor 130 is configured to connect the mounting surface 232 to the rotational bearing 160 only via the inboard side 202.

It is shown in FIG. 2 that the rotor 130 does not connect the mounting surface 232 to the rotational bearing 160 via the outboard side 204. There is no part of the rotor 130 that extends from the mounting surface 232 via the outboard side 204 to the rotational bearing 160. Instead, the rotor 130 extends from the mounting surface 232 to the rotational bearing 160 only via the inboard side 202.

Three different parts can be defined on the rotor 130. The rotor 130 has a first part 131, a second part 132 and a third part 133. The first part 131 is connected to the rotational bearing 160 and extends radially outward. The first part 131 also extends in the axial direction in the inboard direction. By extending in the inboard direction, the rotor 130 extends beyond an axial position of the motor stator 212 on the inboard side. The second part 132 of the rotor 130 begins adjacent to the first part 131 at the axial position of the motor stator 212 on the inboard side. The second part 132 extends radially outward and includes the mounting surface 232. The second part 132 can extend radially outward, because the first part 131 provided enough distance from the central plane 216 so the second part 132 does not conflict with the motor stator 212. The second part 132 is provided with a plurality of holes. Only one hole is shown in FIG. 2. Each hole is provided with a threaded rod 234. The third part 133 of the rotor 130 extends from the second part 132 in the axial direction towards the outboard side 204. The third part 133 is cylindrically shaped and radially encloses an inner space. The third part 133 of the rotor 130 radially encloses the stator 120. The inner space accommodates the inwheel motor 210. The edge of the third part 133, which is on the outboard side of the rotor 130, is provided with a cover plate 238. The cover plate 238 is arranged on the outboard side 204 of the central plane 216. The cover plate 238 is configured to axially cover the inwheel motor 210. The cover plate 238 encloses an axial opening of the inner space.

The wheel rim 140 comprises a radially outward facing surface. The radially outward facing surface has the bead seats 258 and the rim well 256. The bead seats 258 are more radially outward than the rim well 256. Adjacent to the rim well 256, a mounting body 240 is arranged radially inward of the rim well 256. The wheel rim 140 comprises the mounting body 240 to connect the wheel rim 140 to the mounting surface 232 on the rotor 130.

The threaded rod 234 cooperates with a wheel nut 242 to form a fastener to clamp the mounting body 240 between the mounting surface 232 and the fastener.

The wheel rim 140 defines a central rim plane 252 in a radial direction of the wheel rim 140. The two bead seats 258 are arranged symmetrically at opposite sides of the central rim plane 252. The mounting body 240 is arranged at least partly on an inboard side of the central rim plane 252. As is shown in FIG. 2, the rotational bearing 160 is closer to the central rim plane 252 than the mounting surface 232 is to the central rim plane 252. In an embodiment, the rotational bearing 160 is aligned with the central rim plane 252.

A wheel cap 254 is provided on the wheel rim 140. The wheel cap 254 is connected to the wheel rim 140 at the outboard edge of the wheel rim 140. The wheel cap 254 is arranged on an outboard side of the central rim plane 252. The wheel cap 254 is configured to axially cover at least part of an inner space radially enclosed by the wheel rim 140.

The inwheel motor 210 comprises the motor stator 212 arranged on the stator 120, and the motor rotor arranged on the rotor 130. The motor stator 212 extends radially outward from the stator 120 and comprises coils 260. The motor rotor 214 extends radially inward from the third part 133 of the rotor 130 and comprises magnets 262. The coils 260 and the magnets 262 are at a radial offset from each other. That radial offset forms the radial flux bearing gap 264. In this embodiment, the inwheel motor 210 is a radial flux motor.

The motor rotor 214 is attached to the inner surface of the third part 133 of the rotor 130. The magnets 262 are attached to a back iron 266. The back iron 266 is connected to the third part 133 of the rotor 130. In another embodiment, the rotor 130 does not have the third part 133. Instead, the motor rotor 214 is constructed to be attached to the second part 132 of the rotor 130. In this embodiment, the motor rotor 214 radially encloses the stator 120. Optionally, the cover plate 238 is connected to an edge of the motor rotor 214.

The coils 260 of the motor stator 212 are connected to wires that are provided through the stator 120. The stator 120 has a hollow portion for accommodating the wires. The wires connect the coils 260 to a battery and/or to a control unit to provide a drive signal to operate the inwheel motor 210.

The wheel nuts 242 have a conical shape that cooperates with a conical shape in the mounting body 240. When tightening the wheel nut 242, the conical shapes cooperate to align the wheel rim 140 radially with the rotor 130.

On the inboard side of the rotor 130, the brake disc 268 is mounted. The brake disc 268 is coupled to the rotor 130 to rotate along with the rotor 130 relative to the stator 120. The brake disc 268 cooperates with a caliper, which is not shown in FIG. 2. The caliper contacts the brake disc 268 on the radially extending part of the brake disc 268. As is shown in FIG. 2, the mounting surface 232 is radially outward of the brake disc 268, so the mounting surface 232 is radially outward of a contact location where the brake disc 268 and the caliper make contact to generate a brake force.

FIG. 3 shows a further detailed view of the wheel system 100 according to the embodiment of FIG. 1.

The cover plate 238 is provided with protrusions 310 that radially extend from the cover plate 238. Each protrusions 310 has a hole to receive a bolt. The protrusions 310 of the cover plate 238 correspond to protrusions of the rotor 130 that extend radially outward from the third part 133 of the rotor 130. Each of protrusions of the rotor 130 is provided with a threaded hole to receive a bolt. A bolt is inserted in the hole of a protrusion 310 of the cover plate 238 and into the threaded hole of the protrusion of the rotor 130 to clamp the cover plate 238 onto the rotor 130. Depending on the axial stiffness of the cover plate 238, and on the available space, the cover plate 238 is provided with enough protrusions 310 for 3 bolts of 6 bolts or 10 bolts or any other suitable number of bolts. The wheel nuts 242 are accessible via openings in the wheel rim 140. This allows the wheel rim 140 to be mounted and dismounted from the mounting surface 232.

The mounting surface 232 is implemented as a plurality of protrusions extending radially outward from the rotor 130. In this case, there are 10 protrusions. The protrusions have holes to accommodate the threaded rods 234, so the protrusions can be clamped by wheel nuts 242 onto the mounting body 240 of the wheel rim 140.

The wheel rim 140 is provided with a wheel cap 254, which is formed as an integrated part of the wheel rim 140. The wheel cap 254 comprises five spokes. The spokes extends from the outer ring 300 radially inward to the center of the wheel rim 140. The protrusions of the mounting body 240 and the spokes are arranged at a tangentially offset relative to each other. This allows a socket wrench to reach the wheel nuts 242 on the threaded rods 234 that are placed through the holes in the protrusions of the mounting body 240.

Because the mounting body 240 is arranged at a very radially outward position, the mounting body 240 is not compatible with conventional balancing machines. Therefore, the center of the wheel cap 254 is provided with a center hole 330. The center hole 330 corresponds with a center hole of a conventional wheel rim 140. As a result, the wheel rim 140 according to the invention can be balanced on a conventional balancing machine. In an embodiment, an additional wheel cap part is provided to cover the center hole 330 and the space between the spokes when the wheel rim 140 is mounted on the wheel system 100.

FIG. 4 discloses a cross-section of a wheel system 100 according to a second embodiment of the invention. The second embodiment is the same as the first embodiment, except for what is disclosed below. In this embodiment, the first part 131 of the rotor 130 extends axially towards the outboard side, causing the rotational bearing 160 to be radially aligned with the central rim plane 252. The rotational bearing 160, the central rim plane 252 and the central plane 216 are substantially aligned radially with each other. In an embodiment, the rotational bearing 160, the central rim plane 252 and the central plane 216 are radially completely aligned with each other. This results is an optimal use of the material of the rotor 130 to transfer a radial force on the tire 150 to the stator 120.

The mounting body 240 axially extends from the mounting surface 232 on the inboard side 202 to the outboard side 204. Also, the threaded rod 234 extends from the mounting surface 232 on the inboard side 202 to the outboard side 204. Therefore, the wheel nut 242 is located on the outboard side 204, when the wheel nut 242 clamps the wheel rim 140 on the mounting surface 232. The wheel nut 242 is arranged at least partly on the outboard side of the rim well 256. Because the wheel rim 140 has a larger radial dimension on the outboard side of the rim well 256, space is available for the wheel nut 242 and for a wrench to tighten or untighten the wheel nut 242. Further, by providing the mounting surface 232 on the inboard side of the rim well 256, there is space available to radially extend the second part 132 of the rotor 130 to provide sufficient material to support the threaded rod 234. By using these available spaces, the magnets 262 of the inwheel motor 210 can be arranged at the largest radial position possible.

In an alternative embodiment, the wheel cap 254 is connected to the wheel rim 140 at the central rim plane 252. The wheel rim 140 comprises for example threaded holes to cooperate with bolts that clamp the wheel cap 254 on the wheel rim 140 at the central rim plane 252. The threaded holes in the wheel rim 140 to clamp the wheel cap 254 are tangentially between the through holes of the mounting body 240 to mount the wheel rim 140 on the rotor 130. Alternatively, the wheel cap 254 has holes to cooperate with some or all of the threaded rods 234 of the rotor 130. After placing the wheel rim 140 onto the rotor 130, the cover plate 238 is placed by putting the holes of the wheel cap 254 over the threaded rods 234. Then, the corresponding wheel nuts 242 are applied and tightened. This way, the wheel nuts 242 clamp both the wheel rim 140 to the rotor 130 as well as the wheel cap 254 to the wheel rim 140.

FIG. 5 discloses a wheel system 100 according to an embodiment of the invention. The wheel system 100 of FIG. 5 is the same as the wheel system 100 according to the embodiments described above, except for the following. The wheel rim 140 comprises an outer ring 500. The outer ring 500 has an radial outward facing surface 510. The radial outward facing surface 510 has the bead seats 258 and the rim well 256. The rim well 256 extends radially inward of the bead seats 258. The outer ring 500 has two flanges 520 to ensure the tire 150 remains on the bead seats 258.

Radially inward of the rim well 256, the mounting body 540 is arranged. The mounting body 540, in this embodiment, is implemented as a ring, extending radially inward from the rim well 256. The ring is provided with holes. The holes accommodate the threaded rods 234. When clamping the wheel rim 140 on the mounting surface 232, one side of the ring is in contact with the wheel nut 242, whereas the opposite side of the ring is in contact with the mounting surface 232.

FIGS. 6 and 7 show a fourth embodiment according to the invention. The fourth embodiment has the same features as described in the other embodiments, except for what is further described. The fourth embodiment has the wheel rim 140 with mounting body 540 implemented as a ring, like in the third embodiment. The mounting body 540 is located radially inward of the rim well 256. The mounting surface 232 is not shown in FIG. 6, because the cross-section is taken at a location where the mounting surface 232 is not present. The wheel cap 654 is configured to be connected to the mounting body 540 by bolt 600. For example, a nut is provided on adjacent to the mounting body 540 on the inboard side to cooperate with the bolt 600 to clamp the wheel cap 654 on the mounting body 540. In another example, a thread is provided in a hole in the mounting body 540 to receive the bolt 600. The wheel cap 654 extends in an axial direction towards the inboard side 202 to reach the mounting body 540, while axially covering the cover plate 238 on the outboard side 204. The wheel cap 654 is optionally centered with the rotational axis 112 by making contact with the radial outward surface of the third part 133 of the rotor 130.

As shown in FIG. 7, the wheel cap 654 has five spokes. At one end of each spoke, a bolt 600 is provided to clamp the wheel cap 654 onto the mounting body 540. The other end of each spoke is near the center hole 730. The center hole 730 is configured to balance the wheel rim 140 with the wheel cap 654 attached to the wheel rim 140 on a conventional balancing machine.

The wheel cap 654 may be combined with any one of the disclosed embodiments.

The wheel nuts 242, one of which is shown in FIG. 7, to clamp the wheel rim 140 onto the mounting surface 232, are space at a tangential offset with the bolts 600. This way, the wheel rim 140 can be clamped between the wheel nuts 242 and the mounting body 540, and the wheel cap 654 can be clamped between the bolts 600 and the mounting body 540.

As required, this document describes detailed embodiments of the present invention. However it must be understood that the disclosed embodiments serve exclusively as examples, and that the invention may also be implemented in other forms. Therefore specific constructional aspects which are disclosed herein should not be regarded as restrictive for the invention, but merely as a basis for the claims and as a basis for rendering the invention implementable by the average skilled person.

Furthermore, the various terms used in the description should not be interpreted as restrictive but rather as a comprehensive explanation of the invention.

The word “a” used herein means one or more than one, unless specified otherwise. The phrase “a plurality of” means two or more than two. The words “comprising” and "having" are constitute open language and do not exclude the presence of more elements.

Reference figures in the claims should not be interpreted as restrictive of the invention. Particular embodiments need not achieve all objects described.

The mere fact that certain technical measures are specified in different dependent claims still allows the possibility that a combination of these technical measures may advantageously be applied.

The invention claimed is:

1. A wheel system for a vehicle, the wheel system comprising:
- a stator;
- a rotor;
- a rotational bearing; and
- an inwheel motor comprising a motor stator and a motor rotor,
- wherein the rotor is coupled to the stator via the rotational bearing to rotate about a rotational axis,
- wherein the motor stator is connected to the stator,
- wherein the motor rotor is connected to the rotor to cooperate with the motor stator to generate an electromagnetic force to rotate the rotor relative to the stator about the rotational axis,
- wherein the motor stator has a center defining a central plane extending through the center and perpendicular to the rotational axis,
- wherein the central plane has an inboard side and an outboard side,
- wherein, in operational use, the inboard side faces toward a center of the vehicle, and the outboard side faces away from the center of the vehicle,
- wherein the rotor has a radially facing mounting surface configured to be connected to a wheel rim,
- wherein the mounting surface is arranged on the inboard side,
- wherein the rotor couples the mounting surface to the stator only via the inboard side.

2. The wheel system of claim 1, wherein, viewed in a radial direction, the mounting surface is arranged radially outward of the motor rotor.

3. The wheel system of claim 1, wherein the motor stator comprises a plurality of coils, wherein the coils are configured to cooperate with the motor rotor under control of an electrical current through the coils to generate the electromagnetic force, wherein the central plane extends through a center of the coils.

4. The wheel system of claim 3, wherein the motor rotor comprises a plurality of magnets to cooperate with the plurality of coils to generate the electromagnetic force.

5. The wheel system of claim 1, wherein the inwheel motor is one of an axial flux motor and a radial flux motor.

6. The wheel system according to claim 1, comprising a cover plate connected to the rotor, wherein the cover plate is arranged on the outboard side of the central plane, wherein the cover plate is configured to axially cover the inwheel motor.

7. The wheel system according to claim 1, wherein the rotor radially encloses the stator.

8. The wheel system according to claim 1, comprising a brake system having a brake disk and a caliper, wherein the brake disk is connected to the rotor, wherein the brake disk and the caliper are configured to contact each other at a force location to generate a brake force, wherein the mounting surface is radially outward of the force location.

9. The wheel system according to claim 1, wherein at least part of the rotational bearing is arranged closer to the central plane than the mounting surface is arranged to the central plane.

10. The wheel system according to claim 1, comprising the wheel rim, wherein the wheel rim comprises two bead seats for holding a tire, wherein the wheel rim defines a central rim plane in a radial direction of the wheel rim, wherein the two bead seats are arranged symmetrically at opposite sides of the central rim plane, wherein the wheel rim comprises a mounting body configured to connect to the mounting surface, wherein the mounting body is arranged at least partly on an inboard side of the central rim plane.

11. The wheel system according to claim 10, wherein the rotational bearing is arranged aligned with the central rim plane.

12. The wheel system according to claim 10, comprising a fastener, such as a wheel nut, to clamp the mounting body between the mounting surface and the fastener, wherein the wheel rim comprises a rim well arranged between the bead seats, wherein at least part of the fastener is arranged on an outboard side of the rim well.

13. The wheel system according to claim 11, wherein the wheel rim comprises a wheel cap, wherein the wheel cap is arranged on an outboard side of the central rim plane, wherein the wheel cap is configured to axially cover at least part of an inner space radially enclosed by the wheel rim.

14. The wheel system of claim 13, wherein the wheel cap comprises a center hole for balancing the wheel rim on a balancing machine.

15. A vehicle comprising the wheel system of claim 1.

* * * * *